March 25, 1958  F. G. BAKER ET AL  2,828,110
SELECTIVE ROOM HEATER AND COOLER
Filed April 29, 1954  8 Sheets-Sheet 1

INVENTOR.
ARTHUR F. HUBBARD &
BY FORREST G. BAKER
ATTY.

March 25, 1958 F. G. BAKER ET AL 2,828,110
SELECTIVE ROOM HEATER AND COOLER
Filed April 29, 1954 8 Sheets-Sheet 3

INVENTOR.
ARTHUR F. HUBBARD &
BY FORREST G. BAKER
Arthur Robert
ATTY.

March 25, 1958 F. G. BAKER ET AL 2,828,110
SELECTIVE ROOM HEATER AND COOLER
Filed April 29, 1954 8 Sheets-Sheet 4

Fig.9

INVENTOR.
ARTHUR F. HUBBARD &
BY FORREST G. BAKER
ATTY.

March 25, 1958  F. G. BAKER ET AL  2,828,110
SELECTIVE ROOM HEATER AND COOLER
Filed April 29, 1954  8 Sheets-Sheet 7

INVENTOR.
BY ARTHUR F. HUBBARD &
FORREST G. BAKER
ATTY.

March 25, 1958   F. G. BAKER ET AL   2,828,110
SELECTIVE ROOM HEATER AND COOLER
Filed April 29, 1954   8 Sheets-Sheet 8

INVENTOR.
ARTHUR F. HUBBARD &
FORREST G. BAKER
BY Arthur Robert
ATTY.

United States Patent Office

2,828,110
Patented Mar. 25, 1958

2,828,110

SELECTIVE ROOM HEATER AND COOLER

Forrest G. Baker, Moline, Ill., and Arthur F. Hubbard, Davenport, Iowa, assignors to American Air Filter Company, Inc., Louisville, Ky., a corporation of Delaware Application April 29, 1954, Serial No. 426,441

16 Claims. (Cl. 257—3)

The present invention relates to apparatus for conditioning the air in a room, and relates in particular to apparatus for selectively heating or cooling the room.

One conventional form of heating and ventilating unit commercially available comprises a cabinet having inlet means providing openings for admission of outside and recirculated or room air, and an air outlet directed into the room, with a heat exchanger and blower means between the inlet means and outlet for directing air into contact with the heat exchanger and through the outlet into the room. Steam or hot water may be supplied to the heat exchanger to heat the air introduced into the room. The proportion of outside and recirculated air blown into the room is controlled by damper means which can be moved between full closing of the outside air opening and full closing of the recirculating air opening, or to intermediate positions to suitably proportion outside air to recirculated air. Such unit may include a thermostat control which limits the lower temperature of air introduced into the room through the outlet.

Ordinarily, in operation, the damper means proportions outside air and recirculated air, and the supply of heating fluid to the heat exchanger is varied as required. In actual operation, in conditioning rooms having a relatively high occupancy, such as schoolrooms, conditions frequently are encountered, even during the cold seasons, where cooling rather than heating of the room is required. When room conditions call for cooling, the heating medium supplied to the heat exchanger is throttled or cut off, and the proportion of outdoor air to recirculated air introduced into the room may be increased to the point where outside air only is being introduced, the inlet for recirculating air being closed. However, such a unit becomes ineffective as a cooler where the temperature of the outside air is no lower than the desired room temperature.

To provide cooling of a room during conditions when the outside air temperature is higher than the desired room temperature, cooling devices have been employed, and it has been proposed to employ a common heat exchanger to carry a heating medium during the heating season and a coolant during the warm weather. It is desirable to employ water as the coolant for the heat exchanger during the cooling season, but as the temperature differential of cooling water compared to the air is generally smaller than that available from a heating medium, further complications arise in attempts to use the same heat exchanger as a heater and cooler. Heretofore, units incorporating a heater and cooler in the same cabinet have been complicated by employing different damper controls, auxiliary heat exchangers, or different thermostat controls, or various other devices which complicate the structure of operation.

It is an object of the present invention to provide a combined heating, cooling, and ventilating unit of simplified construction and design which employs the same heat exchanger for carrying a heating or cooling medium.

A further object is the provision of a combined heating, cooling, and ventilating unit employing a damper controller which operates at a predetermined point of movement to reverse the damper motion.

Another object is the provision of a combined heating, cooling, and ventilating unit employing a single room thermostatic control for maintaining the desired room temperature during both the heating and cooling cycles.

A further object is the provision of a combined heating, cooling, and ventilating unit incorporating a room air sensing thermostat as a self contained component.

Another object is the provision of a combined selective heating, cooling, and ventilating unit for a room incorporating automatic means responsive to the temperature of the tempering fluid supplied to the heat exchanger to select the heating or cooling cycle.

Another object is the provision of a combined selective heating, cooling, and ventilating apparatus for a room incorporating a common heat exchanger for carrying a heating fluid or a coolant, with means for increasing the effectiveness of the heat exchanger when carrying a coolant.

Another object is the provision of a combined selective heating, cooling, and ventilating unit for a room selectively operating on a heating or cooling cycle to provide modulated maintenance of the desired temperature in the room.

Another object is the provision of a combined selective heating, cooling, and ventilating unit employing a common heat exchanger utilizing a heating fluid in the heating cycle, and chilled water as the cooling medium during the cooling cycle.

In accordance with the present invention, a unit ventilator is arranged to have either a heating medium or a cooling medium introduced into the heat exchanger, so that a single heat exchanger may be employed for either heating or cooling the room, and the selection and flow of heating or cooling medium is controlled so as to introduce into the room warm air or cooled air as required to maintain the desired room temperature. The selection of heating medium or cooling medium supplied to the heat exchanger may be made manually, or by a suitable thermostatically operated means. The invention also incorporates a single control for the dampers of the unit to select or proportion outside or make up air and room air during the heating cycle, and which maintains a predetermined proportion of outside air and room air during the cooling cycle. This single control preferably comprises a single damper motor incorporating automatically operated damper reversing mechanism which operates at the transition into the cooling cycle.

The invention also contemplates an arrangement to reduce the capacity of the heat exchanger when it is carrying heating medium during the heating cycle, while providing adequate heat exchange capacity when carrying chilled water on the cooling cycle. This arrangement provides that a portion of the heat exchanger is traversed by air to be heated during the heating cycle and substantially the entire heat exchanger is traversed by air to be cooled during the cooling cycle. In the preferred arrangement a section of the heat exchanger traversed by make up or outdoor air during the cooling cycle carries the coldest water, and the section traversed by recirculated air carries the water which has already absorbed some heat in its flow through the first section. This provides that the more humid outdoor air is dehumidified by contact with the coldest portion of the heat exchanger. By having the make up air and recirculating air traverse the heat exchanger in crossed directions the resistance of the exchanger reduces the possibility of blow through into the room. If desired, the capacity of the heat exchanger during the heating cycle may be reduced by an arrangement of baffles to shield part of the exchanger. Proper proportioning of air flow is provided by suitable air passages controlled by dampers, the dampers being controlled or regulated by a common damper motor.

The invention will be described in greater detail in connection wtih the accompanying drawing illustrating a preferred embodiment of the invention by way of example, and wherein.

Figures 1, 2, 3:
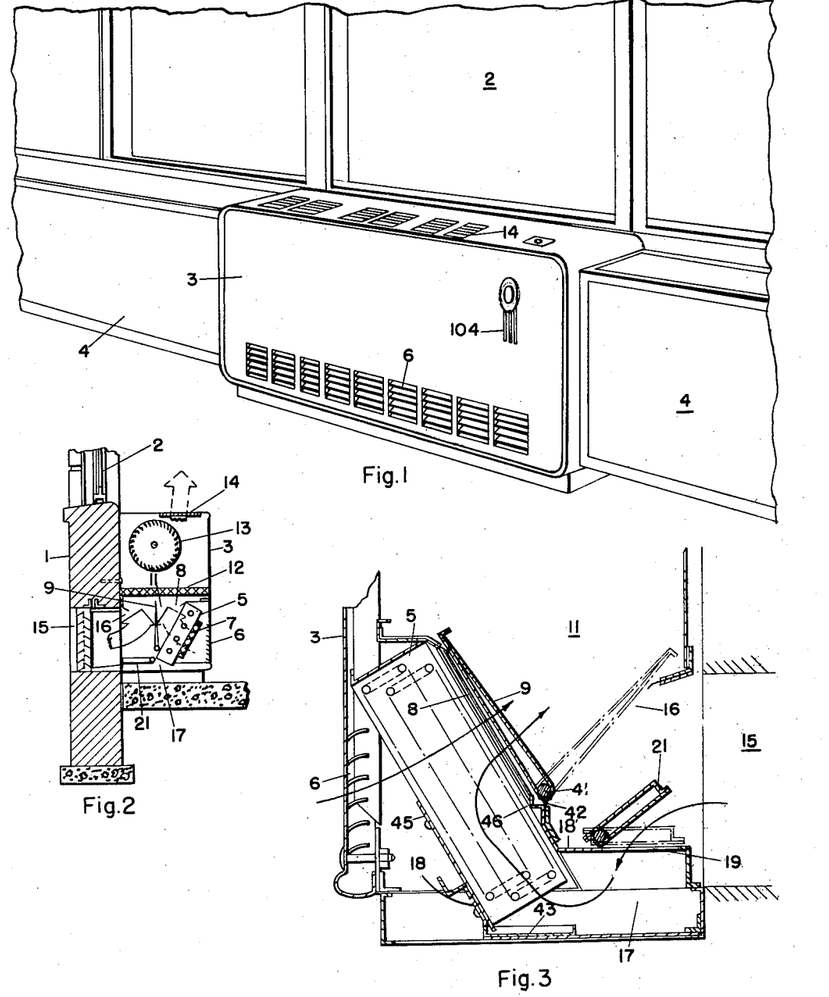
Figure 1 is a perspective view illustrating the invention installed along an outside wall of a room.
Figure 2 is a diagrammatic view showing the operation of the invention during the heating cycle.
Figure 3 is a view similar to Figure 2 showing the operation of the invention during the cooling cycle.
Figure 4:
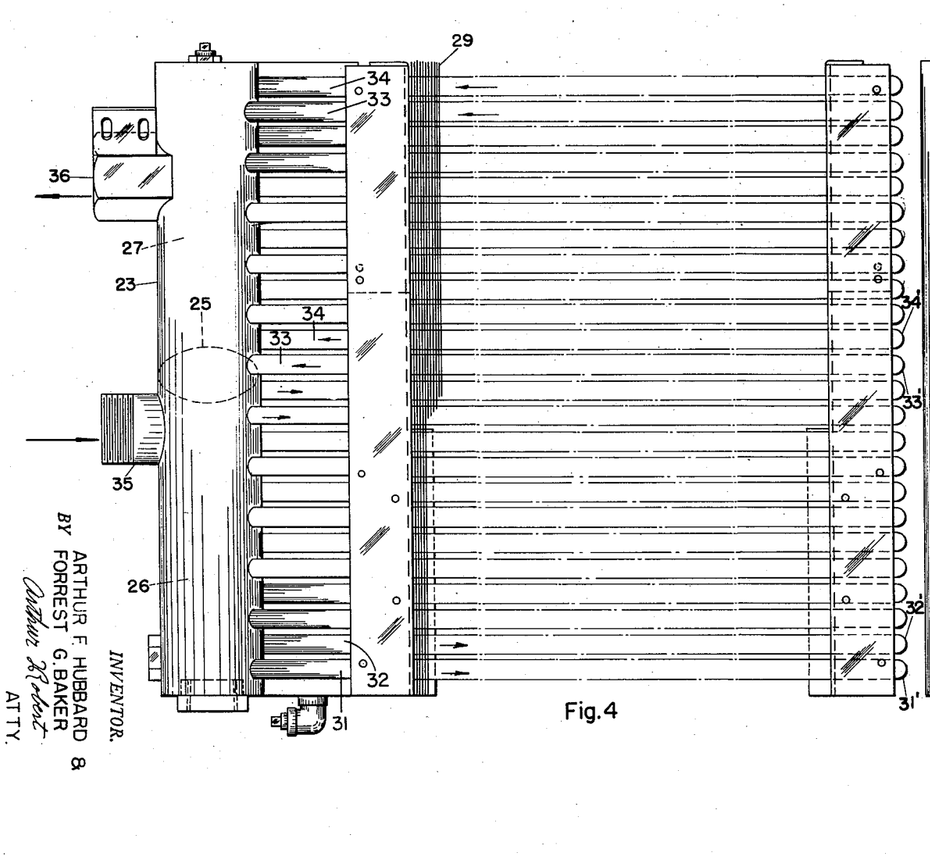
Figure 4 is a rear elevation view of the heat exchanger.
Figure 5:
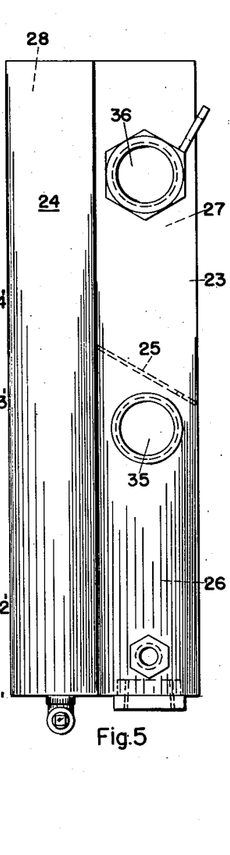
Figure 5 is an end view of Figure 4 as viewed from the left.
Figure 6:
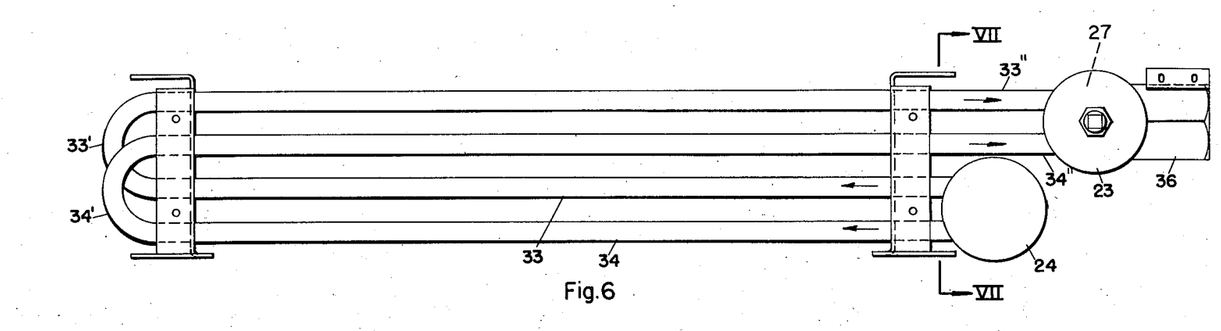
Figure 6 is a plan view of Figure 5.
Figure 7:
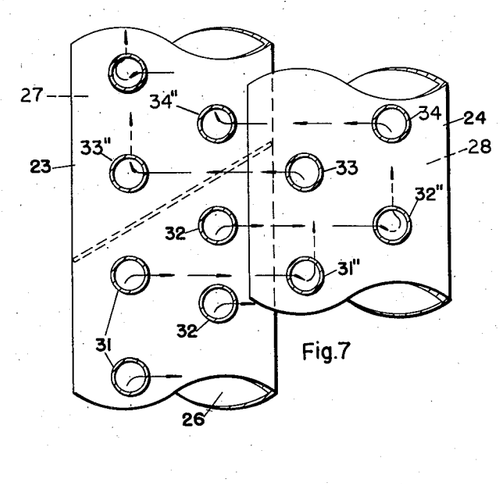
Figure 7 is a fragmentary view in section along line VII—VII of Figure 6.

Referring to the drawing, Figures 1 and 2, there is shown the outer wall 1 of a schoolroom having windows 2 at the usual level, and a combined heating, cooling, and ventilating unit is enclosed in a cabinet 3 beneath the windows. As shown, the cabinet 3 is flanked by utility cabinets 4. Within the cabinet 3 is a heat exchanger 5 carrying a heating fluid, and air for recirculation enters the cabinet through the louvered opening 6, passes through a filter 7 (which may be omitted) and through the heat exchanger 5 and opening 8 controlled by damper 9 into the plenum chamber 11. The path just described is traced by one of the dotted line arrows in Figure 2. An inlet passageway 15 in the room wall for outside air is provided so that outside or make up air flows through this passageway and opening 16, controlled by damper 9, into plenum chamber 11, as shown by the full line outlined arrow in Figure 2. The mixture of outside air and recirculated air flows upwardly from plenum chamber 11 through the filter 12 to blower 13, the blower serving to draw the air through the inlet openings 8 and 16, and to discharge the air mixture through outlet opening 14 into the room. One dotted outline arrow shows the course of the recirculated air and the other shows the course of the mixed air. The structure so far described operates substantially as described in the application of Arthur F. Hubbard, Serial No. 251,429 filed October 15, 1951 now Patent No. 2,723,616 dated November 15, 1955, for Ventilating and Heating Apparatus and Method, to introduce into the room tempered outside air or recirculated air, or a mixture of outside air and recirculated air, the proportions of the mixture being determined by the position of the common damper 9. That is, damper 9 may entirely close opening 8 to admit only outside air; or may entirely close opening 16 to admit only recirculating air; or in intermediate positions it proportions outside air and recirculated air.

Referring to Figure 3, the lower end of the heat exchanger 5 extends into a chamber 17 formed by suitable partitions 18 and 18', the latter having an opening 19 therein controlled by an auxiliary damper 21. When the heat exchanger 5 carries a coolant, such as chilled water, the damper 9 is positioned to close off the outdoor air opening 16 as shown in dot and dash lines in Figure 3, and the auxiliary damper 21 is opened as shown in full lines. In this position, air flows through outdoor opening 15 and opening 19 into chamber 17, as shown by the arrows, and upward through the heat exchanger and into plenum chamber 11, and then to the blower 13 and is discharged into the room. Also, recirculating air passes through opening 6 through the heat exchanger and opening 8 to the plenum chamber, and the mixed outdoor air and recirculated air passes into the blowers and is discharged into the room.

Referring to Figures 4 to 8, at one end of the heat exchanger 5 are the two headers 23 and 24 in the shape of closed end cylinders formed from pipe. Header 23 has an inclined partition 25 therein dividing the header into a lower supply chamber 26 and an upper discharge chamber 27. Header 24 provides an intermediate distributing chamber 28. The heat exchanger preferably is constructed of a plurality of tubes passing through fins 29. In the lower half of the heat exchanger are a series of tubes comprising runs 31, 32, extending from chamber 26 through the fins and bent back at 31', 32' respectively to provide runs 31" and 32" connected to the lower half of header 24. In the upper portion of the heat exchanger are a series of tubes comprising runs 33, 34 extending from the upper half of header 24 through the fins, and bent back at 33', 34' respectively to provide runs 33", 34" connected to the upper half of header 23 in communication with the discharge chamber 27. Inlet 35 in the header 23 connects with the supply chamber 26 to receive heating or cooling water from a supply pipe (not shown). The outlet connection 36 communicating with discharge chamber 27 carries a control valve 37, and a temperature sensory device diagrammatically shown at 38 (Figure 8) is subject to the temperature of the tempering fluid supplied to chamber 26. A bypass conduit 39 extends from the supply chamber 26 to the discharge side of the valve 36, so that the closing of this valve does not stop flow of tempering fluid through the bypass, and thus the sensory device 38 is at all times subject to the temperature of the tempering fluid supplied to the heat exchanger, whether hot or cold. Tempering fluid flows from supply chamber 26 through tube runs 31, 32 and back through runs 31", 32" into intermediate chamber 28, upwardly in chamber 28 and then through tube runs 33, 34 and back through runs 33", 34" into discharge chamber 27.

Referring to Figure 3, a damper shaft 41 mounted in suitable end partitions in the cabinet operates damper 9, and the lower partition 18' carries sealing flaps 42 that engage the hinged edge of the damper to provide an air seal. Suitable additional sealing flaps also are provided to cooperate with the other edges of dampers 9 and 21. A drip pan 43 is provided at the bottom compartment 17 of the cabinet below heat exchanger 5, and may have partition 18 attached thereto. During the cooling cycle condensate collects on the runs and fins of the heat exchanger 5 and flows down into the drip pan 43, which is sloped toward an outlet at one end for carrying away the condensate. At one side the heat exchanger carries a baffle plate 45 adjustably mounted to be raised or lowered so as to shield a portion of the fins of the heat exchanger from contact with recirculating air. This baffle may have slotted holes therein and is attached by screws to the end plates of the heat exchanger. A similar adjustable baffle 46 on the opposite side of the heat exchanger can be adjusted to vary the contact of the outdoor air stream with the coils of the heat exchanger. Baffles 45, 46 thus reduce the capacity of the heat exchanger during the heating cycle. The baffles also may provide a slight adjustment in the proportioning of recirculating air and outdoor air because as the baffle 45 is raised the proportion of recirculating air to outside air is decreased.

Figure 8:
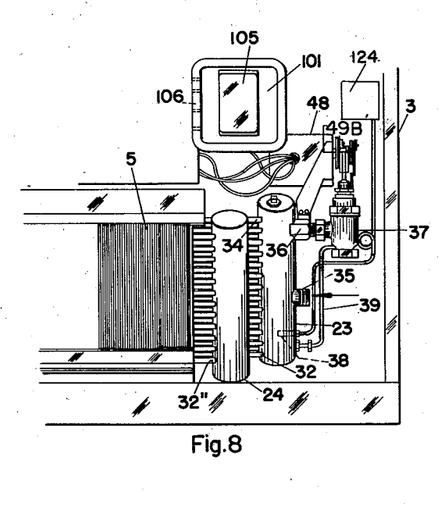
Figure 8 is a front view of part of the apparatus with the cover panel of the cabinet removed.
Figure 9:
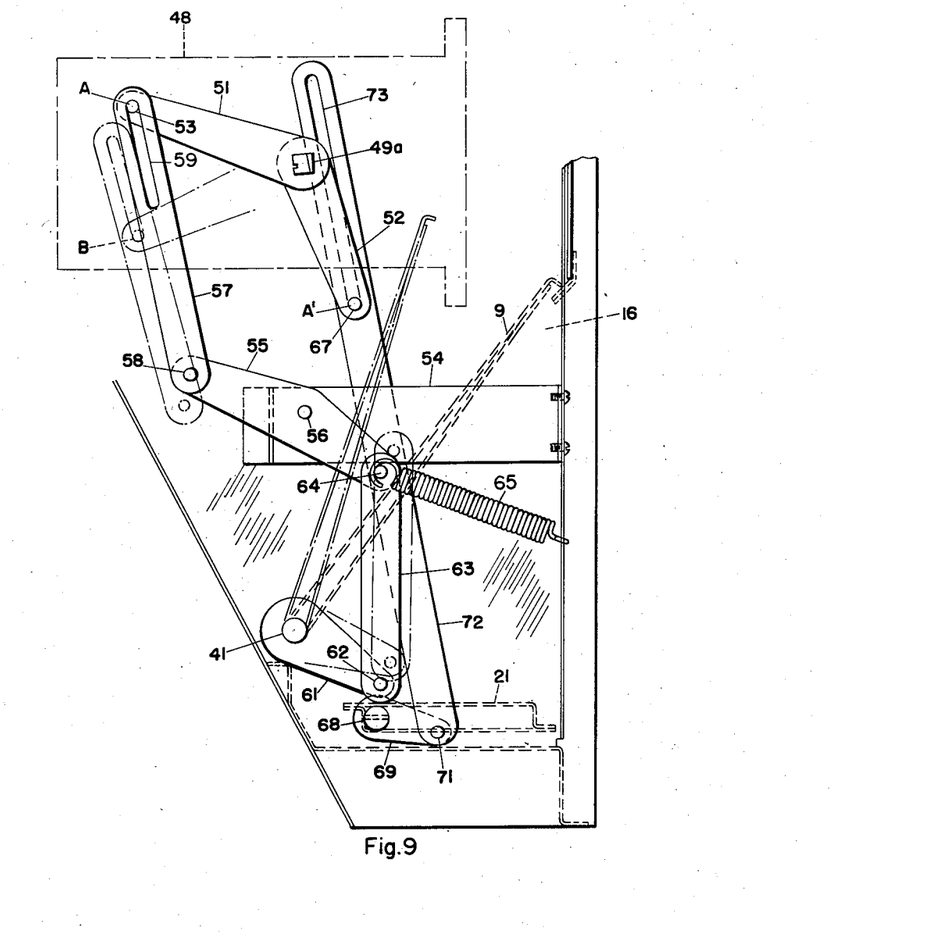
Figures 9, 10 and 11 are views of the damper operating mechanism as seen from the right of Figure 8, in various positions of operation.

The mechanism for positioning the regulating dampers now will be described. A geared damper or servo-motor 48 (Figures 8, 12 and 13) suitably secured in the cabinet drives a rotary shaft 49 (Fig. 15) extending therethrough, the two ends being designated as 49a and 49b, and arms 51, 52 (Fig. 9 to 11) are secured to end 49a to rotate therewith. At its free end arm 51 carries a pin 53. A bracket 54 extending from the cabinet wall carries a rocker lever 55 pivoted at 56 and one end of a link 57 is pivoted to one end of the rocker 55 at 58, the other end of link 57 having a slot 59 to receive pin 53. The damper shaft 41 has an arm 61 secured to the shaft to rotate therewith and carries a pin 62 at its end. A link 63 connects between pivot 62 on arm 61 and pivot 64 at an end of rocker arm 55. A spring 65 anchored to the cabinet wall at one end and connected to rocker arm 55 biases damper 9 to close the outside air opening 16. In the position of the mechanism shown in full lines in Figure 9 the pin 53 in position A engages the upper end of slot 59 and positively holds the damper 9 closing the outside air opening 16 as shown in dotted lines, and recirculating room air only is admitted to the plenum chamber. When the damper motor shaft, in response to the room air thermostat rotates counterclockwise as shown in Fig. 9, to move arm 51 and pin 53 to cause pin 53 to just engage the bottom edge of slot 59, the damper 9 remains stationary as the pin 53 idles in slot 59. Any further counterclockwise movement of the arm 51 will move the damper away from the outside air inlet 16. During the heating cycle, the damper 9 will normally be moved to an intermediate position such as that shown in Fig. 9 in dot-dash lines where both outside and recirculating air is admitted to the plenum chamber. Point B of pin 53 and the dot-dash outlines of arm 51, and links 57 and 63 correspond to this intermediate position of the damper 9.

Figure 10:
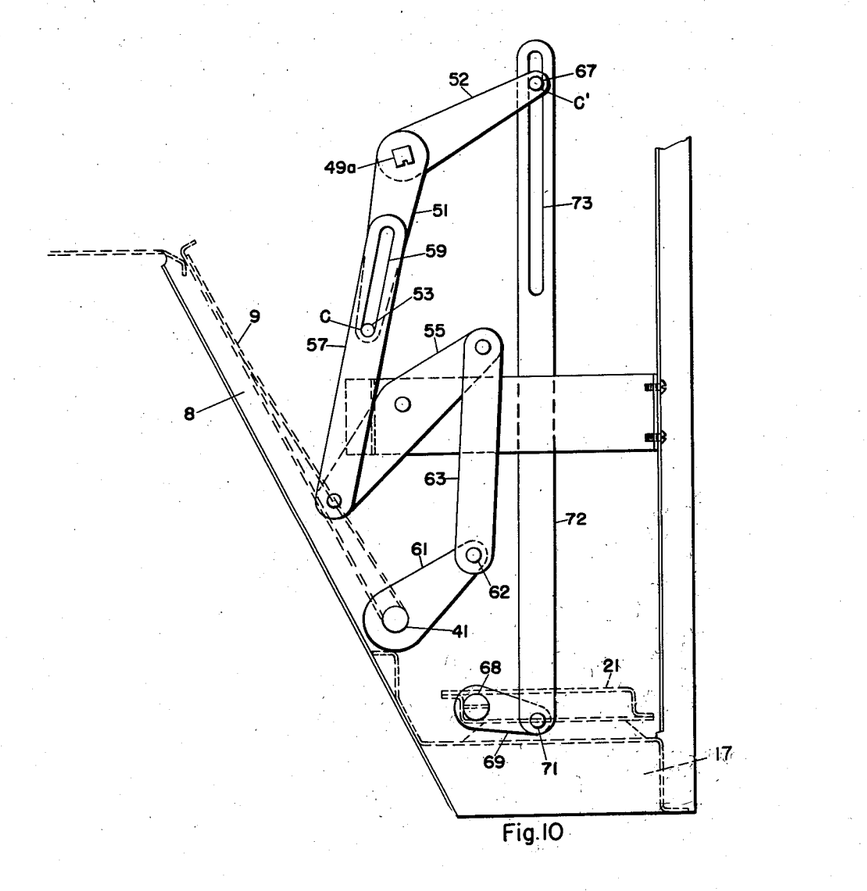
Figure 11:
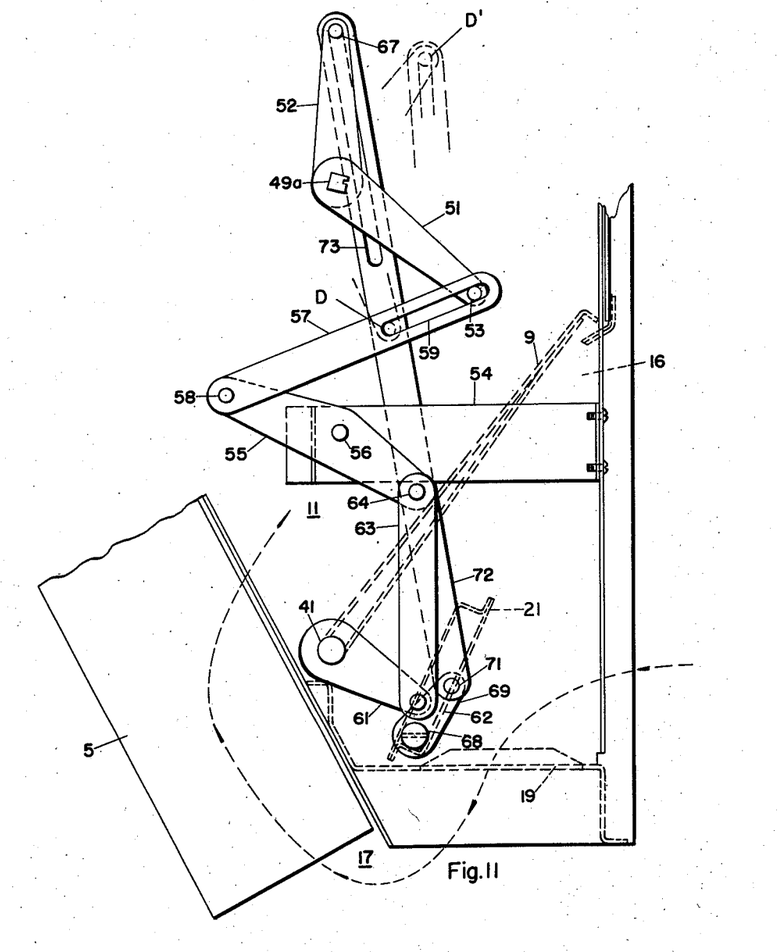

Temperature control of the room during the heating cycle is obtained by the regulation or adjusting of valve 37 (Fig. 8) to modulate the flow of heating medium through the heat exchanger (as will be later described) and by varying the position of the damper 9 to vary the proportion of outside air and recirculating room air admitted to the plenum chamber. If, during the heating cycle, overheating occurs, the heating fluid control valve 37 is throttled gradually and damper 9 uncovers the outside air opening further. The damper may reach the limit of movement in this cycle as shown in Figure 10 at position C, where the recirculating room air opening 8 is fully covered and the outdoor opening is fully uncovered to admit outdoor air for cooling the room. At this stage of operation the fluid control valve for the heat exchanger is closed, and cooling of the room occurs so long as the temperature of the outdoor air is lower than the desired room temperature.

The positions A' and C' (Figs. 9 and 10) of arm 52 correspond to positions A and C of arm 51. The arm 52 on damper motor shaft 49a has a pin 67 at its end. Shaft 68 of the auxiliary damper 21 carries an arm 69 with a pivot pin 71 at its end connected to one end of link 72, the other end of link 72 having a slot 73 that receives pin 67. It will be observed the damper motor shaft can rotate to move arms 51, 52 counterclockwise beyond the position represented at C, C'. When the arm 51 is moved by shaft 49 counterclockwise beyond position C the rocker arm 55 is rotated clockwise so that spring 65 returns damper 9 to its position closing outdoor opening 16, this action being permitted by the movement of pin 53 in slot 59, and the recirculating air opening 8 now is open. Also, substantially at position C, pin 67 has engaged the upper end of slot 73 in link 72, so that the continued counterclockwise movement of the motor shaft and arms 51, 52 in allowing damper 9 to close, also lifts link 72 to open damper 21. Damper 21 is at its substantially fully opened position at D', indicated by the dot and dash line positions of the links in Figure 11, and arm 51 can move to position D because of the lost motion of pin 53 in slot 59. Also, the damper motor can rotate counterclockwise to move arm 52 beyond position D' but this additional movement does not effectively change the outdoor air flow through opening 19. This additional rotation of motor shaft 49 is employed to open the valve 37 to admit chilled water to the heat exchanger, as will be later described. This arrangement provides that during rotation of arm 51 from positions A to C, arm 52, which also rotates from positions A' to C', does not move damper 21 because pin 67 idles in slot 73. Upon further counterclockwise rotation of arms 51 and 52 beyond positions C and C' respectively, damper 9 starts to move to return to its outdoor air closing position and damper 21 starts to open to admit outdoor air to chamber 17. These motions of the dampers continue until the arms 51 and 52 reach positions D, D' respectively (Fig. 11) at which point damper 9 fully closes outdoor air opening 16 and damper 21 substantially fully opens opening 19.

Figure 12:
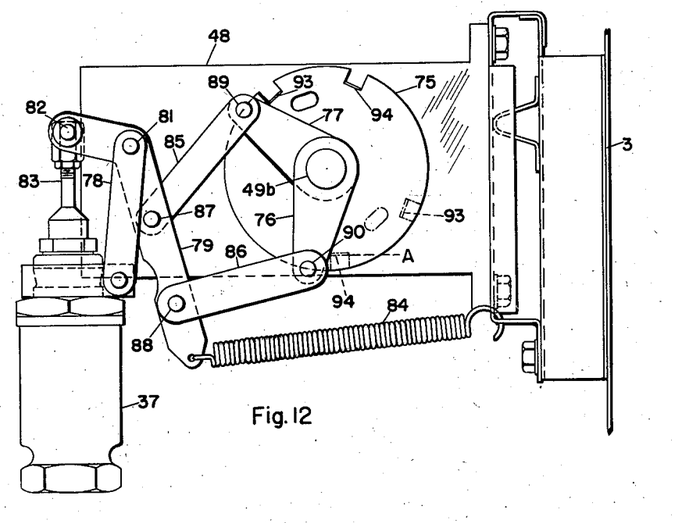
Figures 12 and 13 are side elevation views of the valve operating mechanisms.
Figure 13:
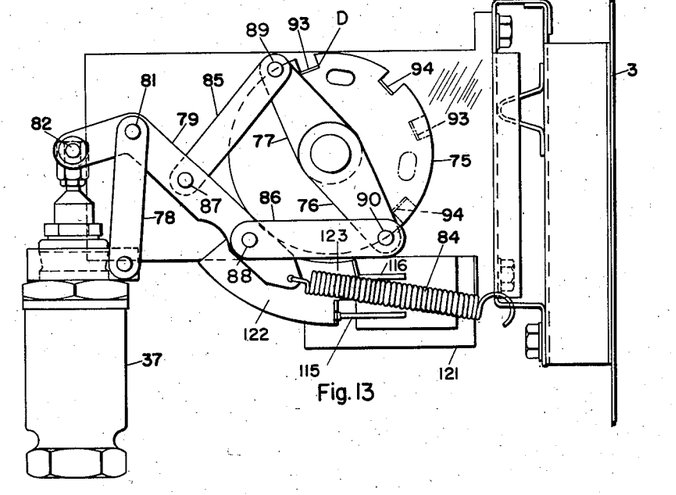

Referring to Figures 12 and 13 the end 49b of the motor shaft 49 carries an actuator plate 75 to rotate therewith, and arms 76, 77 are freely swivelled on the shaft. The valve 37 carries a yoke or bracket 78 on its housing and a bell crank lever 79 is pivoted at 81 on the yoke, the shorter end of this lever being connected by an adjustable clevis on the valve stem 83 to pivot 82. The valve is shown in closed position in Figure 13 and it will be seen that, to open the valve, the bell crank lever rotates clockwise to the position shown in Figure 12. A spring 84 anchored to the housing of the cabinet at one end and to the bell crank 79 at its other end biases the bell crank counterclockwise towards closed position of the valve. Links 85, 86 are swivelled at 87 and 88 on the bell crank lever, and these links are swivelled at their opposite ends at 89 and 90 to the free ends of arms 77, 76 respectively.

Disc or plate 75 has struck out lugs 93 and 94. Figure 12 shows the lugs 94, 93 in dotted lines at the position of the motor shaft corresponding to position A, Figure 9. Upon counterclockwise rotation of disc 75 by motor shaft 49, as seen in Figure 12, the lug 94 disengages arm 76 to allow spring 84 to rotate bell crank lever 79 counterclockwise, toward valve closing position. As the lug 94 in the dotted line position shown in Figure 12 prevents the bell crank 79 from moving counterclockwise under the bias of spring 84, it will be seen that the degree of closing of the valve thus is determined by the position of the lug 94 and disc 75, which in turn is determined by the degree of rotation of the motor shaft. It will be noted that the coupled arms and links 76, 86 and 77, 85 float freely, and can take any position required to permit the bell crank 79 to operate the valve. Thus on continued counterclockwise rotation of the motor shaft and disc the lug 94 reaches the dotted line position as shown in Figure 13 where it may be still in contact with arm 76 but the valve is closed. Upon further counterclockwise rotation of disc 75 the valve remains closed until lug 93 reaches the full line position shown in Figure 13 at which point it is engaging arm 77 and the valve is closed. Now, further rotation counterclockwise of disc 75 causes the lug 93 to move arm 77 counterclockwise about the shaft, so that, through link 85 the bell crank is rotated clockwise against the bias of spring 84 to open the valve. The dotted line position of lug 94 in Figure 12 corresponds substantially to the position A of the motor shaft and dampers as shown in Figure 9, and the full line position of lug 93 in Figure 13 corresponds substantially with the position D of the motor shaft and dampers as shown in Figure 9. The operation of the valve as above described is correlated with the damper movements, as will now be explained.

Figure 14:
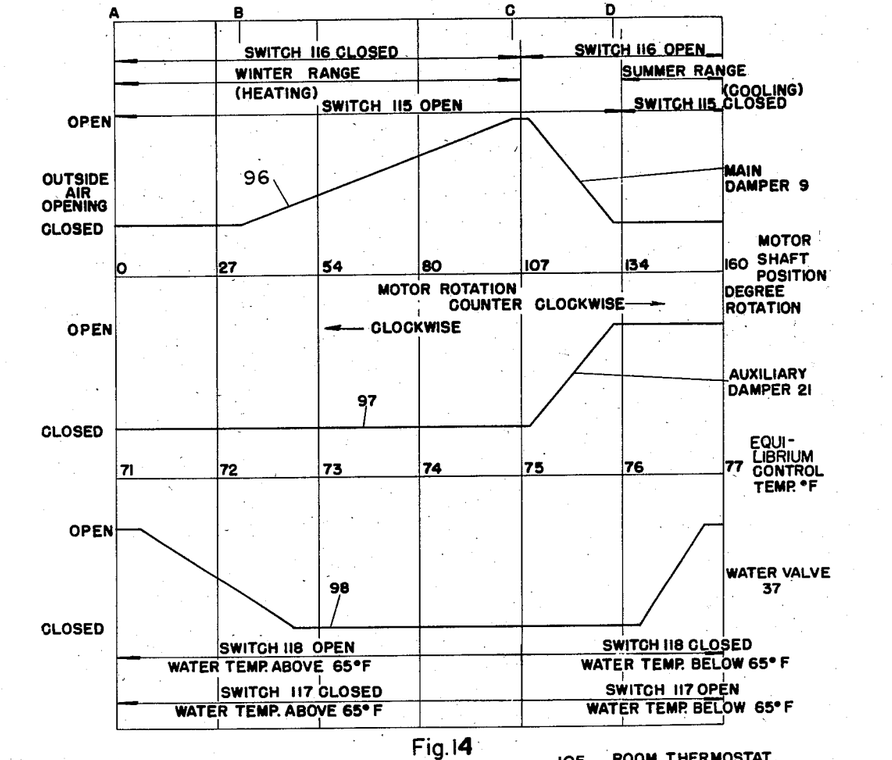
Figure 14 is a graphical diagram illustrating the operation of the apparatus.

Referring to Figure 14, the graph 96 represents generally the operation of damper 9, graph 97 represents generally the operation of damper 21, and graph 98 represents generally the operation of valve 37. The degree of rotation of motor shaft 49 is indicated on the abscissa, and the temperature scale indicated on the abscissa represents a room temperature substantially equal to the thermostat setting. That is, it is assumed that at any given point on the temperature scale during the heating cycle the heat input of the room is equal to the heat loss, and during the cooling cycle the heat gain of the room is equal to the cooling effect. Under such equilibrium conditions the intersection of the ordinate at any given temperature point with the graphs 96, 97 and 98 indicates the corresponding positions of dampers 9, 21, valve 37 and motor shaft 49 required to maintain such equilibrium temperature conditions in the room.

The term heating cycle, as herein employed refers to operating conditions in which heating fluid is being supplied to inlet 35 even though valve 37 is closed. This is indicated on the graph in the range between 71° and 75° (approximately). The cooling cycle as herein referred to refers to operating conditions in which chilled water is being supplied to inlet 35 even though valve 37 may be closed. This is indicated on the graph in the range above 76°. The range between 75° and 76° is the transition zone between the heating and cooling cycles, the forward boundary of this zone being at 76° and the rear boundary being at 75°. It is to be understood the graphs and temperature ranges of the heating and cooling cycles are merely illustrative.

It will be seen that if any substantial deviation from equilibrium temperature conditions in the room arises the motor position must shift in order to operate damper 9 and valve 37 to restore equilibrium. Thus, during the heating cycle, an increase in heat loss of the room will require the motor to rotate clockwise to reduce the amount of outside air being supplied and to increase the amount of heating fluid supplied to the heat exchanger, and conversely, an excessive heating of the room will require that the motor rotate counterclockwise to increase the amount of outside air supplied and reduce the amount of heating fluid supplied to the heat exchanger. Similarly during the cooling cycle, a gain in room temperature will require that the motor rotate counterclockwise to increase the flow of chilled water to the heat exchanger, while a loss in room temperature will require that the motor rotate clockwise to decrease the flow of chilled water to the heat exchanger. This operation of the motor is obtained by any conventional room thermostat and control circuit. One such circuit now will be described by way of example.

Figure 15:
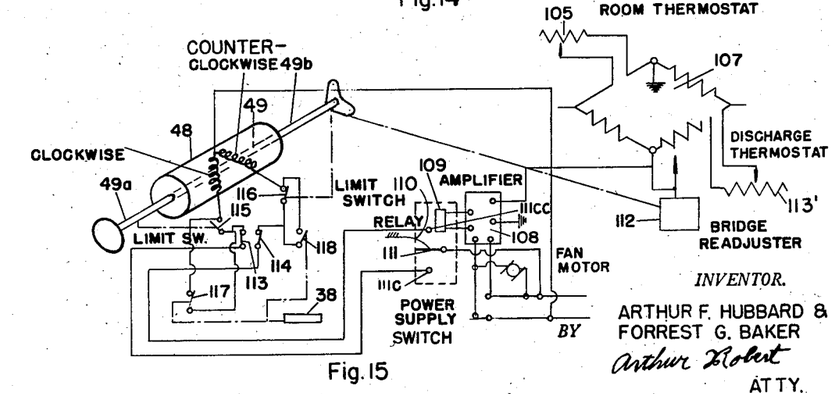
Figure 15 is an electrical wiring diagram of the control mechanism.

The room sensory element or thermostat is preferably located in the cabinet 3, its operation being substantially as described in the application of Arthur F. Hubbard, Serial No. 426,674 filed April 30, 1954 for Self Contained Room Ventilating Unit. As shown in Figures 1 and 8, a compartment 101 in the front of cabinet 3 has openings 104 for admission of sampling air drawn by the blower 13 through the compartment over sensory element 105 and through the grilled opening 106 into the blower compartment. Figure 15 shows how the sensory element controls the servo motor 48 to control the dampers 9 and 21 and valve 37. The Wheatstone bridge 107 is unbalanced so that when the room temperature is at the setting of thermostat 105 the potential supplied to the amplifier 108 energizes relay coil 109 enough to hold switch 111 against leaf spring 110, thus holding switch 111 in neutral position and the damper motor is deenergized. It will be understood that the potential impressed by the bridge on the amplifier varies generally as the temperature of the sensory element 105, and that, for a given setting of this element the bridge impresses an increased potential on the amplifier when the thermostat 105 senses an increase in temperature, and the potential impressed on the amplifier is reduced by a decrease in sensed temperature. If the room temperature falls, the resistance of the room thermostat 105, which is one leg of the Wheatstone bridge, will also fall and the potential supplied to the amplifier will drop, so that the relay coil 109 will be deenergized enough to allow switch 111 to engage contact 111C and energize the clockwise coil of the motor, thus rotating the motor clockwise. On the other hand, if the room temperature rises above the setting of the room thermostat the voltage or potential supplied to the amplifier increases enough to energize relay coil 109 to overcome the action of spring 110, so that switch 111 engages contact 111CC to energize the counterclockwise coil of the motor, thus rotating the motor counterclockwise. The control system includes a bridge adjuster 112 which is operated by motor 48 to change the resistance of the other leg of the bridge in a direction to counteract the potential effect of the room thermostat produced by a change in room air temperature, and thus return switch 111 to neutral. This action causes a step by step operation of motor 48 in small increments. A thermostat 113' in the discharge air stream of the blower also produces a small counteracting effect on the potential to the amplifier, the combined effect of bridge adjuster 112 and discharge thermostat 113' serving to prevent or reduce cycling or hunting action.

The motor incorporates limit switches 113, 114 which open the motor circuit at 0° rotation and at 160° rotation respectively, so that when one of these limits is reached the motor can only operate in the reverse direction. The direction of rotation of the motor arbitrarily is indicated as counterclockwise or forward (left to right in Figure 14) and clockwise or reverse (right to left in Figure 14). The counterclockwise circuit of the motor includes intermediate limit switch 116 which is normally closed during the heating cycle and is opened when the motor, in rotating counterclockwise, reaches some intermediate position. This point of opening of limit switch 116 is the upper limit of the heating cycle of operation or the rear boundary of the transition zone, and on Figure 14 occurs at about point C. A switch 118 in the counterclockwise circuit of the motor in parallel with switch 116 is subject to sensory element 38 in the heat exchanger and this switch is maintained open as long as the temperature of the water supplied to the heat exchanger is above a predetermined value, for example 65° F. Switch 117 in the clockwise circuit of the motor is closed by sensory element 38 as long as the water temperature is above 65° F. Limit switch 116 will limit the counterclockwise movement of the motor to the rear boundary of the transition zone, and limit switch 113 will limit the clockwise rotation of the motor when 0° is reached. From this description it will be seen that in the heating cycle the motor 48 can rotate clockwise or counterclockwise as required by the room thermostat, but cannot enter the transition zone.

When chilled water (65° or lower) is supplied at inlet 35, the sensory element 38 closes switch 118 and opens switch 117. Closed switch 118, being in parallel with switch 116, renders opening of the latter at the rear boundary of the transition zone ineffective, so that the motor can rotate counterclockwise beyond point C into the transition zone in response to the room thermostat. It will also be observed that as the sensory element 38 has opened switch 117, and switch 115 is open, the room thermostat can only cause the motor to rotate counterclockwise. Thus, when the apparatus has been operating in the heating cycle with a heating fluid supplied to the heat exchanger, and then chilled water is supplied to the heat exchanger and the room thermostat senses a room temperature higher than the thermostat setting, the thermostat will rotate the motor counterclockwise through the transition zone to beyond position D in the cooling cycle range. Switch 115 is closed by the motor at point D. Now, in the cooling cycle range as switch 115 has closed, and switch 118 is closed, the motor can rotate clockwise or counterclockwise as reacquired by the room thermostat. However, at the 160° position limit switch 114 opens to limit counterclockwise rotation, and at the 134° position intermediate limit switch 115 opens to limit clockwise rotation. Thus, when the apparatus is in the cooling cycle the motor can rotate clockwise or counterclockwise as required by the room thermostat but cannot enter the transition zone or return to the heating cycle range. To return the apparatus to the heating cycle it is necessary (a) to supply heating fluid to the heat exchanger to operate switches 118, 117 by the sensory element 38, and (b) that the thermostat sense a heat requirement for the room—i. e., the actual room temperature be sufficiently below the setting of the room thermostat that the motor is energized for the required extent to move it into the heating cycle range.

The operation will now be described. Starting with hot water supplied to the heat exchanger, the room thermostat set at 72.5°, and the room temperature below this setting, switches 116, 117 (Figure 15) are closed. The room thermostat will cause the motor to rotate clockwise step by step by deenergization of relay coil 109 to some position to close or restrict the outside air opening and to open valve 37 to supply heat to the room. The extent of rotation of the motor for a given difference between the room thermostat setting and the room temperature will depend on the characteristics of the mechanism. As the room temperature rises and approaches the room thermostat setting the motor will rotate counterclockwise step by step, opening damper 9 and throttling valve 37 until equilibrium of room temperature and room thermostat setting is reached. If room temperature rises above the room thermostat setting, the motor will be rotated counterclockwise step by step by energization of relay coil 109 to open damper 9 further and throttle or shut off valve 37 to cool the room in order to restore equilibrium with the room thermostat setting. However, if the room temperature continues to rise above 72.5°, the movement of the motor will close the water valve and the damper 9 will be opened further to admit more outdoor air, and this movement will continue until the motor movement is reversed by the room thermostat or until at approximately position C switch 116 opens to stop the counterclockwise operation of the motor. Thereafter, a further room temperature rise cannot operate the motor counterclockwise into the transition zone, but as switch 117 is closed, a drop in room temperature can (through switch 111) operate the motor clockwise.

When chilled water is supplied to the heat exchanger, and the room thermostat senses a temperature above its setting (the room thermostat may be left at its setting of 72.5°, if desired), the apparatus shifts through the transition zone into the cooling cycle. This is because the chilled water flows through bypass 39 to affect the sensory element 38 which closes switch 118 and opens switch 117, so the room thermostat can now cause the motor to rotate counterclockwise step by step through the transition zone into the cooling cycle range, where the motor will assume the position required to open valve 37 to supply chilled water to the heat exchanger. As the room temperature approaches the room thermostat setting the motor will rotate clockwise step by step to throttle valve 37 and reduce the flow of chilled water through the heat exchanger, and thus the apparatus will tend to maintain the room air at the setting of the thermostat.

It will be seen that to convert the apparatus from the heating cycle to the cooling cycle, no adjustment of the thermostat is needed. It is necessary only that (a) chilled water be supplied to the heat exchanger, and (b) that the room thermostat sense a room temperature above the setting of the thermostat.

Referring to Figure 13, the switches 115 and 116 are mounted on a switch box 121 adjacent the motor, and cams 122, 123 on the motor shaft operate switches 115 and 116 respectively. In this figure switch 116 is open and switch 115 is closed, this corresponding to the motor position at D, and the switches remain in this position during operation of the cooling cycle. The switches 117 and 118 are housed in a box 124 mounted within the cabinet.

We claim as our invention:

1. A dual heating and cooling ventilator for a room comprising: a cabinet having air inlet means and an air outlet, and including a heat exchanger adapted to receive a tempering fluid, and blower means between the inlet means and outlet for directing air from the inlet means through said outlet into the room, said air inlet means including openings for the admission of outside air and recirculating room air, and damper means movable to positions controlling said openings; a servomotor having a heating cycle range of movement and a cooling cycle range of movement, and forward and reverse circuits for moving said servomotor forwardly and reversely within said ranges, said servomotor being connected to said damper means to move it between a first position closing said outside air opening and a second position closing said recirculating air opening during said heating cycle; a room thermostat for activating said circuits in response to room temperature requirements; a normally closed limit switch in the forward circuit operable to open at the upper limit of movement of said motor in the heating cycle range; a temperature responsive switch in the reverse circuit closed above a predetermined temperature of tempering fluid supplied to the heat exchanger; a normally open temperature responsive switch shunting said limit switch and closed below a predetermined temperature of tempering fluid supplied to the heat exchanger to allow the motor to enter the cooling cycle range in response to requirements of the room thermostat; and a second limit switch in the reverse circuit effectively shunting said first temperature responsive switch and operable to open at the lower limit of movement of said motor in the cooling cycle.

2. An apparatus as specified in claim 1 having an outdoor air bypass connected from the outdoor air opening to said heat exchanger, a second damper means controlling said bypass; and means operatively connecting said motor and second damper means at the upper limit of movement of the motor in the heating cycle range for opening said second damper means.

3. A ventilator for a room comprising: a cabinet having air inlet means and an air outlet, and including a heat exchanger adapted to receive a tempering fluid, a valve for controlling flow of said tempering fluid, and blower means between the inlet means and air outlet for moving air from the inlet means through the outlet into the room; said air inlet means including openings for admission of outside air and recirculating room air; an auxiliary air passageway for admission of outside air; first damper means for controlling said inlet openings; an auxiliary damper for controlling said auxiliary passageway; a servomotor having a heating cycle range of operation and a cooling cycle range of operation; means connecting said servomotor to said first damper means for moving said damper means between a first position closing the outside air inlet opening and a second position closing said recirculating air opening in the heating range cycle of operation; means connecting said servomotor to said auxiliary damper for moving said auxiliary damper to open said auxiliary passageway in the cooling cycle range of operation; a room thermostat, and a temperature sensory element responsive to the temperature of the tempering fluid supplied to the heat exchanger and cooperating with the room thermostat for selecting the heating cycle range or cooling cycle range of operation of said servomotor.

4. A ventilator for a room as specified in claim 3 including reversing mechanism connected between the first damper means and servo motor operable at the upper range limit of the heating cycle for moving said damper from the second position to the first position.

5. A ventilator as specified in claim 3 including a valve for controlling flow of tempering fluid through said heat exchanger; and means connecting said servomotor and valve for opening said valve near the ends of said ranges of operation of the servomotor.

6. A control apparatus for a room air conditioning mechanism having heat exchanger means adapted to receive a cold or hot tempering fluid comprising: a sensory means subject to the temperature of the tempering fluid supplied to the heat exchanger; a servomotor adapted to be operated by a room thermostat in reverse or forward direction, said motor having a transition zone of movement between a rear and forward boundary; means responsive to said sensory means below a predetermined temperature and adapted to cooperate with a room thermostat to render the second limit means hereinafter specified ineffective at the rear boundary and maintain the servomotor movement in the forward direction in said transition zone at least to the forward boundary; a first limit means adapted to cooperate with the room thermostat when the servomotor is forward of the forward boundary for moving said motor in reverse direction, and limiting reverse direction movement of said motor substantially at said forward boundary; means responsive to said sensory means above a predetermined temperature and adapted to cooperate with a room thermostat to render said first limit means ineffective at the forward boundary to maintain the servomotor movement in reverse direction in said transition zone at least to the rear boundary; and a second limit means adapted to cooperate with the room thermostat when the servomotor is rearwardly of the rear boundary for moving said motor in forward direction, and limiting forward direction movement of said motor substantially at said rear boundary.

7. An apparatus as specified in claim 6 having a valve to control flow of tempering fluid through said heat exchanger; and means operated by said motor when said motor is forward of the forward boundary to open said valve for admission of cold tempering fluid to the heat exchanger means.

8. An apparatus as specified in claim 7 having means operated by said motor when said motor is rearward of the rear boundary to open said valve for admission of hot tempering fluid to the heat exchanger means.

9. An apparatus as specified in claim 7 having a first air inlet for directing recirculating room air through said heat exchanger means, and a second air inlet for directing make up air through said heat exchanger means.

10. An apparatus as specified in claim 6 having a first air inlet for directing recirculating air through said heat exchanger to a plenum chamber; and a second air inlet for directing make up air to said plenum chamber; damper means positioned to close said first inlet when said motor is substantially at said rear boundary, and means connecting said motor and damper means to move the damper means to open said first inlet upon forward movement of said motor in said transition zone.

11. An apparatus as specified in claim 10 wherein movement of said damper means is arrested in said zone when the motor is substantially at the forward boundary, and wherein said last mentioned means provides lost motion relative to said damper means and motor to permit continued forward movement of said motor past said forward boundary.

12. A dual heating and cooling ventilator comprising a cabinet having air inlet means and air outlet means, blower means disposed within the cabinet for inducing a flow of air therethrough, said air inlet means including openings for admission of outside air and recirculating air, heat exchange means disposed within said cabinet having a portion thereof disposed in the flow path of recirculating air and adapted to receive a tempering fluid, said tempering fluid being of one temperature character for heating and ventilating operations and of a second temperature character for cooling and ventilating operations, primary damper means displaceable between a first extreme position substantially closing the outside air admission opening and a second extreme position substantially closing the recirculating air admission opening for varying the ratio of outside air to recirculating air admitted through said openings, an auxiliary air inlet opening for direct admission of outside air to a portion of the heat exchange means, auxiliary damper means for closing said auxiliary air inlet opening, thermostatic means for sensing a departure of the room air temperature from a predetermined desired value, control means having a first operating range for heating and ventilating operations and a second operating range, for cooling and ventilating operations, means for selectively determining the desired operating range of said control means in accordance with the temperature character of the tempering fluid damper displacing means included in said control means operable in said first operating range in response to a sensed increase in room air temperature over said predetermined value by said thermostatic means for displacing said primary damper means progressively from said first extreme position to said second extreme position, said damper displacing means including means operable in said second operating range in response to a sensed increase in temperature over said predetermined value by said thermostatic means for displacing said primary damper from said second extreme position to said first extreme position and for opening said auxiliary damper means to permit introduction of outside air to said heat exchange means.

13. A ventilator as specified in claim 12 wherein said heat exchange means comprises: a second portion in the recirculating air stream having tubes connected in parallel each at one end to a distributing header and at the other end to a discharge header; and a first portion in the air stream from the auxiliary passageway having tubes in parallel connected each at one end to a supply header and at the other end to said distributing header.

14. The apparatus as specified in claim 12 wherein said means for selectively determining the operating range of said control means is automatically responsive to the temperature character of the tempering fluid introduced into the heat exchange means.

15. The apparatus as specified in claim 12 wherein said control means includes limit means operative in said first operating range to halt displacement of said primary damper means at said second extreme position and means for rendering said limit means inoperative in said second operating range.

16. The apparatus as specified in claim 12 wherein said heat exchange means includes valve means for controlling the amounts of tempering fluids introduced thereto and wherein said control means includes valve control means responsive to a sensed departure of room air temperature from predetermined desired values by said thermostatic means for regulating the flow of tempering fluid through the heat exchange means to counteract said sensed temperature departure.

References Cited in the file of this patent

UNITED STATES PATENTS

| | | |
|---|---|---|
| 1,990,468 | Bridges | Feb. 12, 1935 |
| 2,006,344 | Bulkeley | July 2, 1935 |
| 2,315,517 | Greenlee et al. | Apr. 6, 1943 |
| 2,331,691 | Hubbard | Oct. 12, 1943 |
| 2,327,663 | Otis | Aug. 24, 1943 |
| 2,343,467 | McGrath | Mar. 7, 1944 |
| 2,407,036 | Snavely | Sept. 3, 1946 |